United States Patent [19]

Carsner et al.

[11] Patent Number: 5,086,215

[45] Date of Patent: Feb. 4, 1992

[54] METHOD AND APPARATUS FOR DISCRIMINATING OR LOCATING BAR CODES FOR AN OPTICAL MARK READER

[75] Inventors: George E. Carsner; John V. McMillin, both of Iowa City, Iowa

[73] Assignee: National Computer Systems, Inc., Eden Prairie, Minn.

[21] Appl. No.: 262,869

[22] Filed: Oct. 26, 1988

[51] Int. Cl.$^5$ ............................................. G06K 7/10
[52] U.S. Cl. ................................. 235/462; 235/463; 235/470; 250/568
[58] Field of Search ............ 235/454, 462, 463, 472, 235/383, 470; 250/566, 568

[56] References Cited

U.S. PATENT DOCUMENTS

| | | | |
|---|---|---|---|
| 3,774,014 | 11/1973 | Berler . | |
| 3,928,759 | 12/1975 | Sansone | 250/568 |
| 4,007,377 | 2/1977 | Simon et al. | 250/566 |
| 4,041,322 | 8/1977 | Hayosh et al. | 250/568 |
| 4,057,784 | 11/1977 | Tafoya | 235/462 |
| 4,092,525 | 5/1978 | Daboub et al. | 235/463 |
| 4,357,596 | 11/1982 | Feilchenfeld | 235/436 |
| 4,484,068 | 11/1984 | Mazumder | 235/462 |
| 4,567,361 | 1/1986 | Rosenthal | 235/462 |
| 4,652,731 | 3/1987 | Chautemps et al. | 235/462 |
| 4,667,089 | 5/1987 | Shirakabe et al. | 235/462 |
| 4,746,789 | 5/1988 | Gieles et al. | 235/463 |
| 4,873,426 | 10/1989 | Sarna et al. | 235/462 |
| 4,933,538 | 6/1990 | Heiman et al. | 235/463 |

Primary Examiner—Stuart S. Levy
Assistant Examiner—Edward H. Sikorski
Attorney, Agent, or Firm—Dorsey & Whitney

[57] ABSTRACT

A method and apparatus for discriminating bar codes for an optical mark reader is provided comprising a scanning means for scanning a target area on a scannable form and producing a signal in response to certain indications, i.e., marks or spaces, in the target area, detection means for detecting indications having a width within a preselected range of widths, first comparator means for comparing the number of detected indications to a specified range of valid numbers of detected indications, and second comparator means for comparing the output of the first comparator means for two consecutive sweeps of the scanning means and enabling means for producing an enabling signal when the output of the first comparator means is valid for two consecutive sweeps, such that the enabling signal enables a bar code scanner to scan and decode the bar code, and a picking signal when the output of the first comparator means is not valid for two consecutive sweeps during a scan of the entire target area, such that the picking signal enables the optical mark reader to begin mark scanning of the scannable form.

7 Claims, 7 Drawing Sheets

Fig. 2

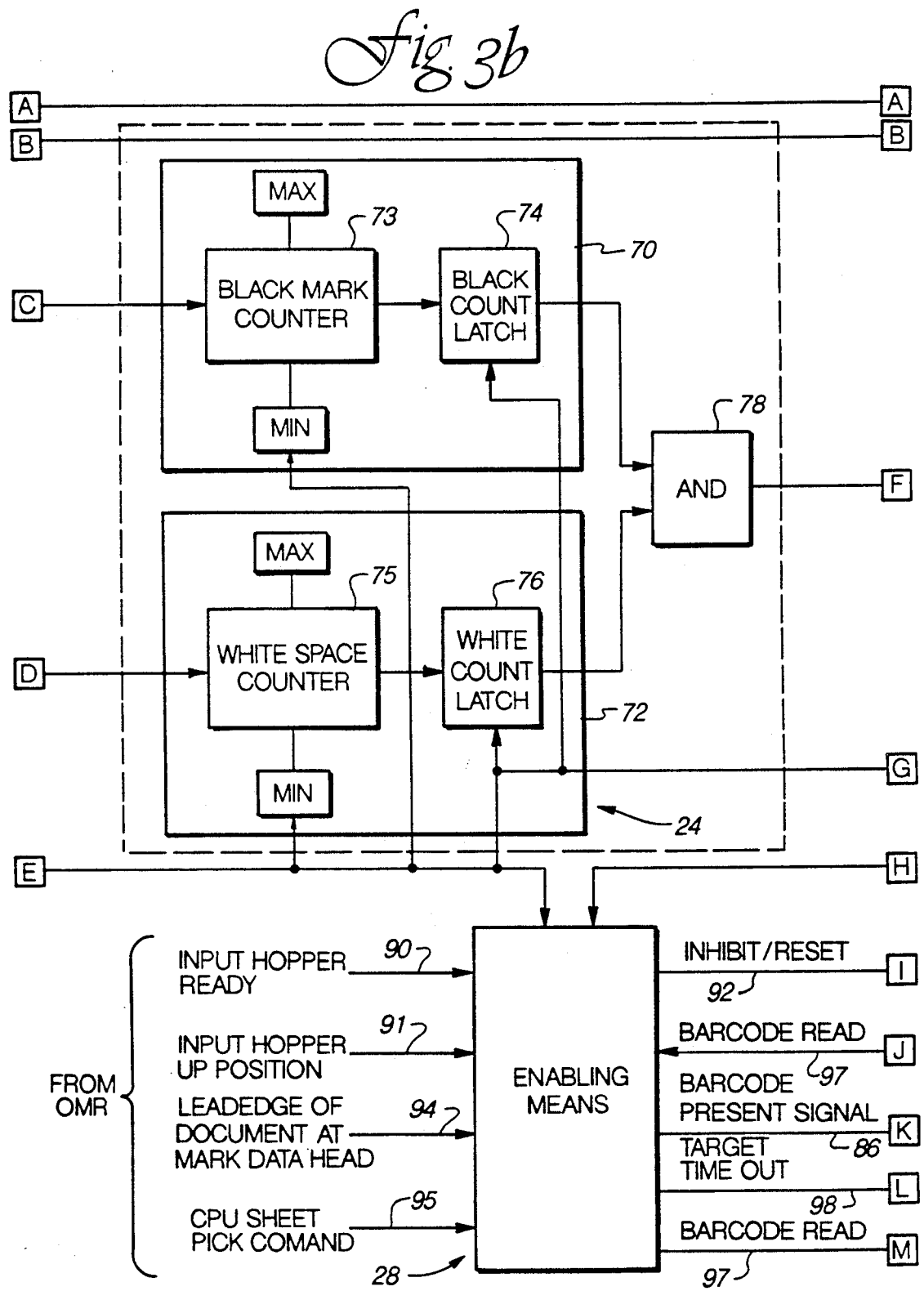

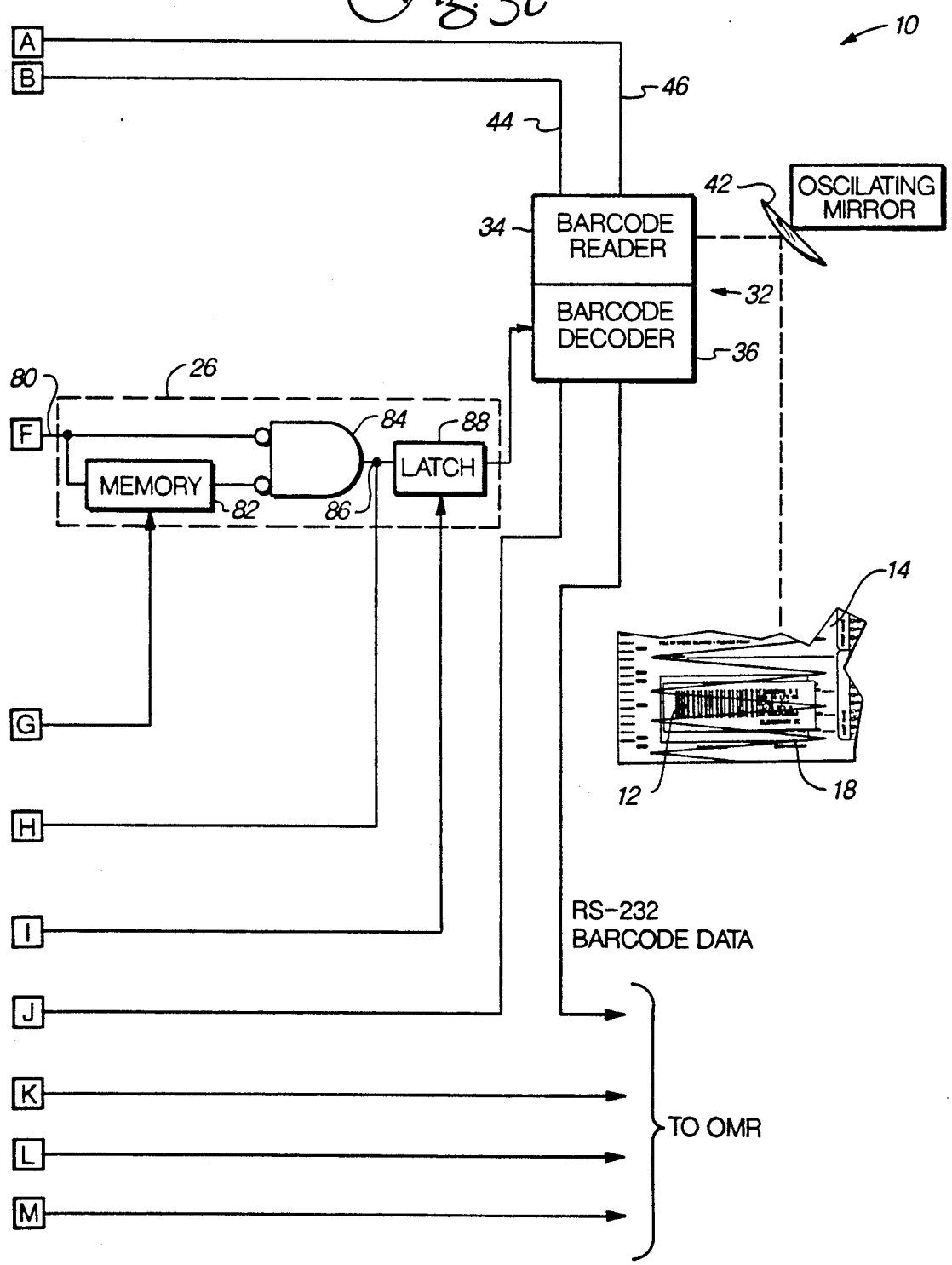

METHOD AND APPARATUS FOR DISCRIMINATING OR LOCATING BAR CODES FOR AN OPTICAL MARK READER

TECHNICAL FIELD

The present invention relates to a scanning system comprised of an optical mark reader having the capability to scan or read bar codes. More particularly, the present invention relates to a method and apparatus for discriminating the presence of a bar code on a scannable form to be scanned by such a scanning system.

PRIOR ART

Scanning systems of both the optical mark reader type and the bar code scanner type are well-known in the prior art. It has been recognized that the use of bar codes on scannable forms can substantially reduce the need for manual gridding of identification or background data on such forms. By integrating a bar code containing a multiple digit identification code with the scannable form, a scanning system can be given the ability to link the scannable form to a pre-existing data file containing identification or background data having the same identification code. The accuracy and efficiency of such an scanning system is enhanced when the previously entered and edited identification or background data associated with the bar code is used to replace, verify or supplement similar information on the scannable form.

While current bar code scanners are capable of discriminating a bar code from background marks or noise on a scannable form, they do so by actually reading and decoding the bar code and the amount of time necessary to identify and decode a bar code on a scannable form is significantly greater than the typical time for the picking cycle of a high speed optical mark reader. More importantly, the time out period for current bar code scanners is often five to ten times longer than the time typically required to scan and decode a bar code, if one is present. Consequently, in applications where a bar code may or may not be present on a scannable form, it is not practical to examine every scannable form using conventional bar code scanning techniques to determine whether a bar code is present. To do so would delay the optical mark reader by the full time out period each time a bar code was not present on the scannable form.

Prior art bar code discriminating mechanisms are also not suitable for discriminating whether a bar code is present on a scannable form. For example, U.S. Pat. No. 4,667,089 discloses a Bar Code Discriminating Apparatus for Bar Code Reading based on a sequential analysis of the width of the scanned signals. While this apparatus may be useful for some applications, the text and response bubbles on a typical scannable form may have a frequency content similar to the frequency of the signals generated by scanning a bar code. Consequently, an analysis of the width or frequency of the signals generated by using this apparatus would not be effective in determining the presence or absence of a bar code on a scannable form.

Accordingly, it would be desirable to provide for a method and apparatus for discriminating bar codes for an optical mark reader having the capability to scan or read bar codes that will quickly, efficiently and reliably determine the presence or absence of a bar code on a scannable form.

SUMMARY OF THE INVENTION

In accordance with the present invention, a method and apparatus for discriminating bar codes for an optical mark reader is provided comprising a scanning means for scanning a target area on a scannable form and producing a signal in response to certain indications, i.e., marks or spaces, in the target area, detection means for detecting indications having a width within a preselected range of widths, first comparator means for comparing the number of detected indications to a specified range of valid numbers of detected indications, and second comparator means for comparing the output of the first comparator means for two consecutive sweeps of the scanning means and enabling means for producing an enabling signal when the output of the first comparator means is valid for two consecutive sweeps, such that the enabling signal enables a bar code scanner to scan and decode the bar code, and a picking signal when the output of the first comparator means is not valid for two consecutive sweeps during a scan of the entire target area, such that the picking signal enables the optical mark reader to begin mark scanning of the scannable form without decoding the bar code.

In the preferred embodiment, the present invention utilizes the wide black marks and the wide white spaces of an interleaved 2 of 5 bar code symbology as the basis for detecting both the width of the indications and comparing the number of detected indications to a range of expected numbers of indications. Because non-bar code markings and spacings on a scannable form for an optical mark reader may produce a scanning signal having characteristics similar to that of a typical bar code, particularily the characteristics of narrow bars and narrow spaces of a bar code, the wide black marks and wide white spaces are the preferred indications in the bar code to analyze for discriminating whether a bar code is present in the target area. This is because the target area is less likely to contain wide black marks or wide white spaces that indicate the presence of a bar code, but is likely to contain text, response indicia or other marks or indications that may be subject to misinterpretation as the narrow bars and narrow spaces of a bar code. In addition, the invention requires that the scanned signal be within this range of valid indications for a bar code for two consecutive sweeps of the scanning means. By selecting a sweep pattern and rate that will pass over the bar code twice and requiring two consecutive valid sweeps, the method and apparatus of the present invention further assures that a valid bar code has been detected in the target area, rather than a random number of spaces and marks generated by text, response indicia, or other background noise on the scannable form. Thus, the present invention utilizes three different tests, an acceptable range of widths of the indications in a bar code, an acceptable range of counts of the number of indications in a bar code, and two consecutive acceptable sweeps to discriminate the presence of the bar code on a scannable form.

An object of the present invention is to provide a method and apparatus for discriminating bar codes for an optical mark reader having the capability to scan or read bar codes that will quickly and efficiently determine the presence or absence of a bar code on a scannable form.

A further object of the present invention is to provide a method and apparatus for effectively discriminating a bar code from text, response indicia, and other background noise on a scannable form.

Another objective of the present invention is to provide a method and apparatus for discriminating bar codes that verifies the presence of a valid bar code pattern on two consecutive sweeps of the target area.

A further object of the present invention is to provide a method and apparatus for discriminating bar codes for an optical mark reader that is faster than the time out value of the bar code scanner used to decode the bar code.

These and other objectives of the present invention will become apparent with reference to the drawings, the description of the preferred embodiment and the appended claims.

DESCRIPTION OF THE DRAWINGS

FIG. 2 is a pictorial representation of a scannable form having a bar code incorporated therewith that may be discriminated by the method and apparatus of the present invention.

FIGS. 3a-3c is a detailed block diagram of the preferred embodiment of the present invention.

FIGS. 5a-5c are pictorial representations of the scanning means of the present invention showing the requisite scanning frequency.

DESCRIPTION OF THE PREFERRED EMBODIMENT

Figure 1:
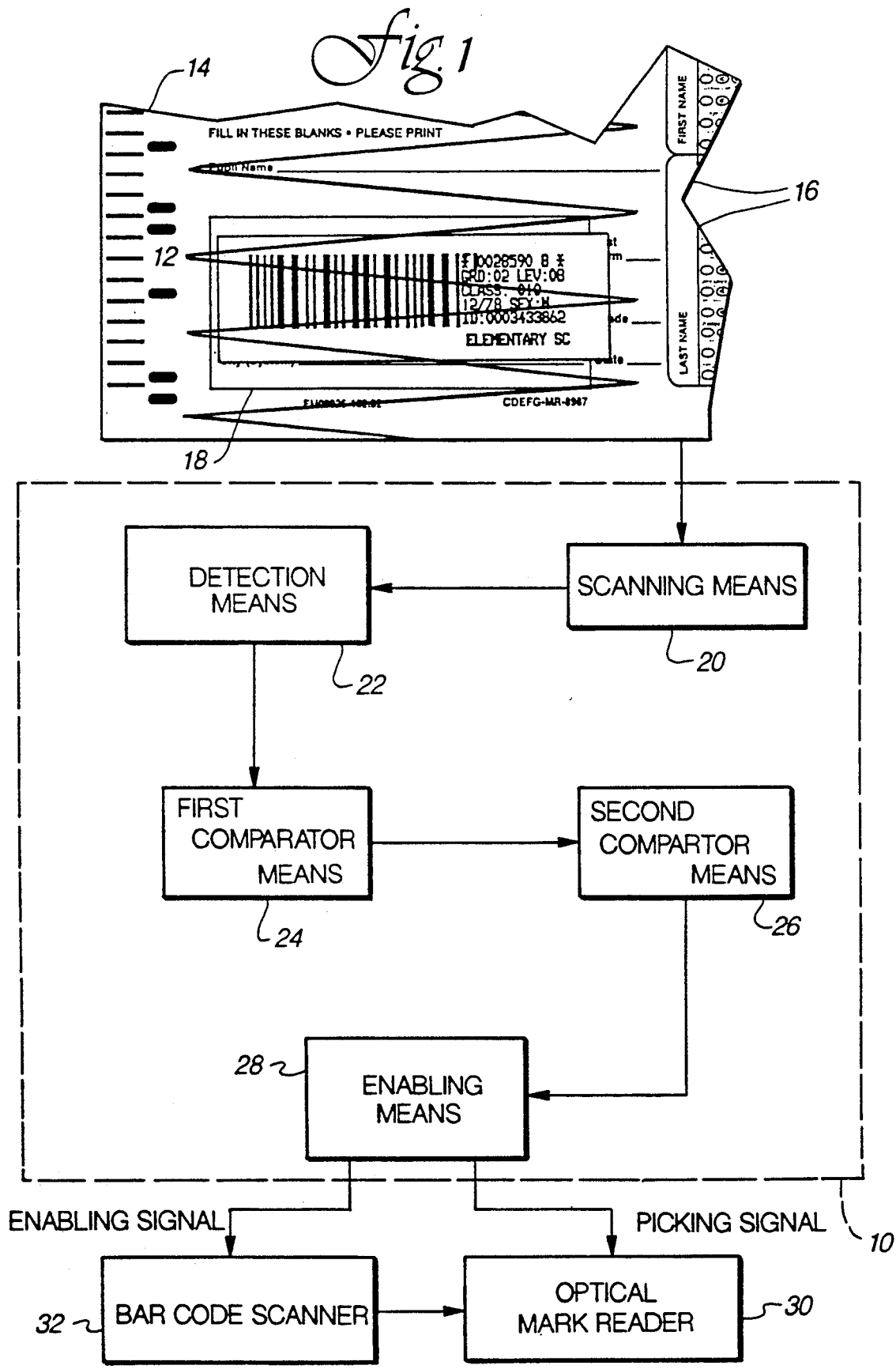
FIG. 1 is a simplified block diagram of the present invention showing the discrimination of a bar code on a scannable form.
Figure 2:
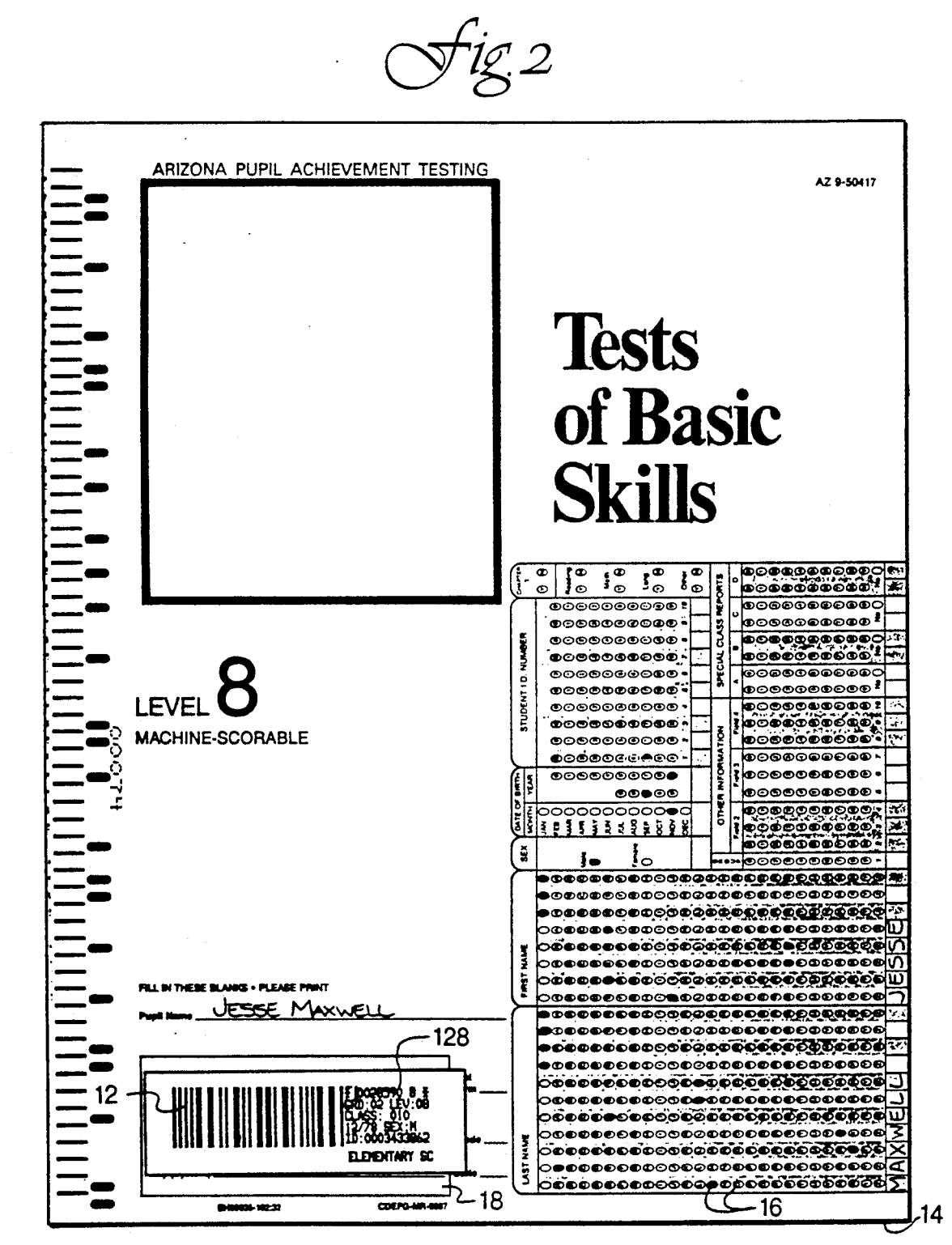

Referring now to FIG. 1, the components of an apparatus for discriminating bar codes for an optical mark reader in accordance with the present invention will be described. The discriminator apparatus 10 operates to determine the presence or absence of a bar code 12 on a scannable form 14. The scannable form 14 is of a mark scan type having response indicia 16 that may be filled in by a respondent to indicate the presence of data corresponding to that response indicia 16, as shown in FIG. 2. The bar code 12, if present, is located in a predefined target area 18 that may be defined by the user as any portion of the scannable form 14. For purposes of the present invention, reference will be made to the bar code 12 and scannable form 14 as if looking downward on the upper side of scannable form 14 with the bar code 12 positioned nearer the trailing or bottom edge of the scannable form 14.

Referring again to FIG. 1, the discriminator apparatus 10 is comprised of a scanning means 20 for scanning the target area 18 of the scannable form 14 and producing a signal in response to certain indications, e.g., marks or spaces, in the target area 18; detection means 22 for detecting indications having a width within a preselected range of widths; first comparator means 24 for comparing the number of detected indications to a specified range of valid numbers of detected indications; second comparator means 26 for latching the output of the first comparator means 24 and comparing the output of the first comparator means 24 for two consecutive sweeps of the scanning means 20; and enabling means 28 for producing an Enabling Signal when the output of the first comparator means 24 is valid for two consecutive sweeps, such that the Enabling Signal enables a bar code scanner to scan and decode the bar code 12, or a Picking Signal when the output of the first comparator means 24 is not valid for two consecutive sweeps during a scan of the entire target area 18, such that the Picking Signal enables an optical mark reader to begin mark scanning of the scannable form 14.

The discriminator apparatus 10 is used in conjunction with a conventional high speed optical mark reader (OMR) 30 and a conventional bar code scanner (BCS) 32. In the preferred embodiment of the present invention, the OMR 30 is a HPS 9101 available from National Computer Systems, Inc., Eden Prarie, Minn. The OMR 30 is provided with a picking means that is capable of picking the scannable forms 14 from an input hopper (not shown) at a rate of 4.16 sheets per second or 240 milliseconds per sheet. In this embodiment, the discriminator apparatus 10 is utilized to screen scannable forms 14 as they sit in an input hopper ready to be scanned by the OMR 30. The scannable forms 14 are positioned in the input hopper such that the next form to be scanned by the OMR 30 will be picked from the top of the stack on the input hopper.

Figure 3A:
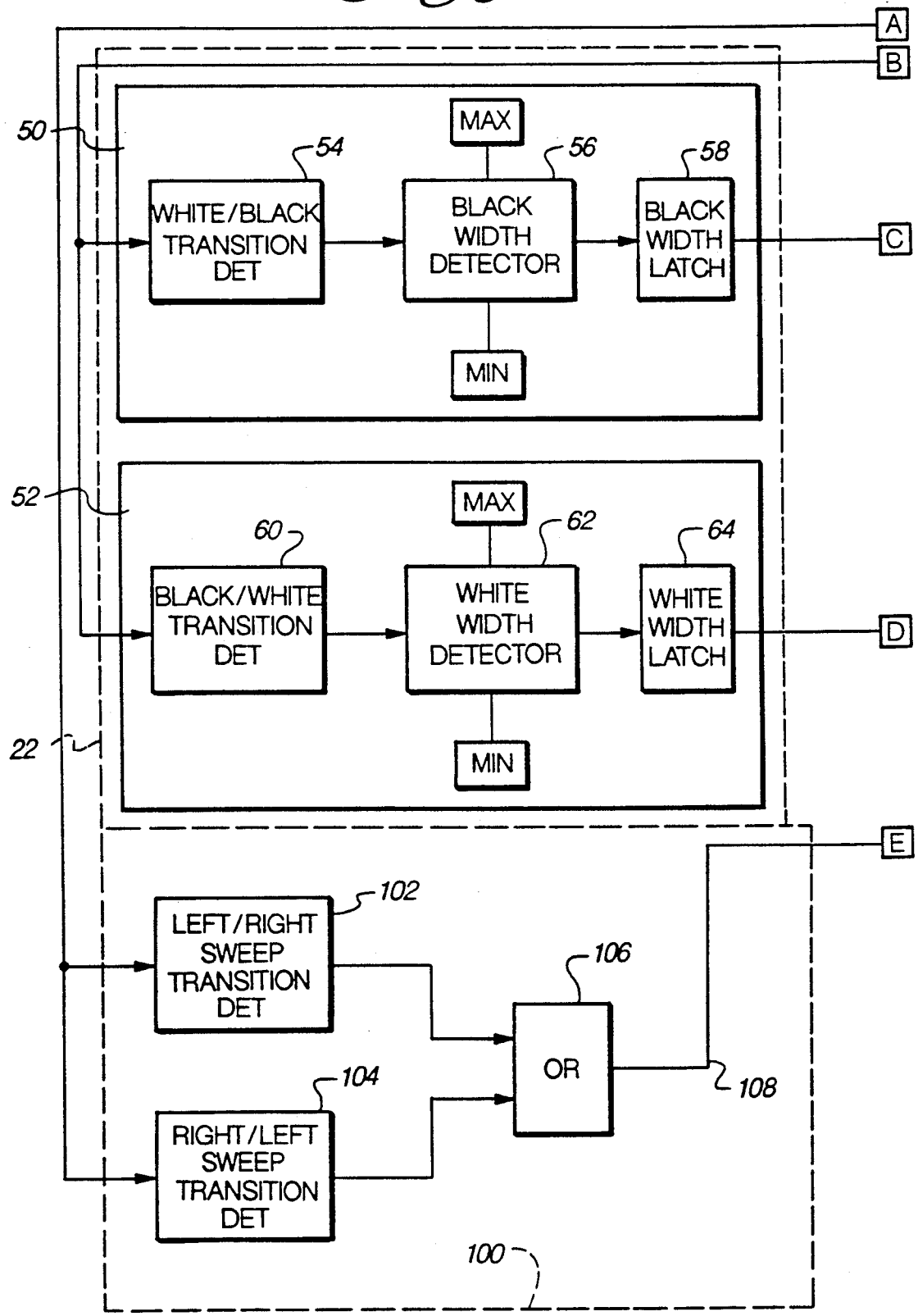

As shown in FIGS. 3a-3c, in the preferred embodiment the BCS 32 is comprised of a laser bar code reader 34 and a bar code decoder 36. The bar code reader 34 is a Symbol Technology 6500 available from Symbol Technology, Inc., Bohemia, N.Y. The bar code reader 34 has a scanning sweep rate over the preferred target area 18 of 37 Hz. The bar code decoder 36 is a Laser Technology LL-320-101-A, also available from Symbol Technology, Inc. The bar code decoder 36 is capable of decoding a bar code 12 in 185 msecs after the first sweep that passes over the bar code 12. The time out period for the bar code decoder 36 when a bar code 12 is not present in the preferred target area 18 is approximately 2 seconds. It should be noted that other bar code scanners with faster scanner sweep rates may be used with the present invention and would enable the bar code reader to more quickly decode the bar code 12 if it is present and would also allow the discriminator apparatus 10 to more quickly determine whether the bar code 12 is present in the target area 18.

Referring now to FIGS. 3a-3c, the components of the preferred embodiment will be described in greater detail. The scanning means 20 is comprised of an oscillating mirror 42 coupled with the laser beam of the bar code reader 34 to generate a scan rate of the laser beam over the target area 18 in a reciprocating zig-zag type of pattern in the manner shown at the top of FIG. 1. The bar code reader 34 provides the discriminator apparatus 10 with a digital output signal 44 representing the black marks ("1's") and the white spaces ("0's") that the laser beam passes over. It should be noted that the black marks and white spaces need not actually be black and white; they merely need to be differentiable based on the intensity of the reflected laser beam light as it passes over the target area 18. The bar code reader 34 also provides the discriminator apparatus 10 with a digital sweep signal 46 representing the direction of the sweep of the laser beam across the target area 18, either left-to-right or right-to-left.

The detection means 22 is comprised of a pair of detectors, black mark detector 50 and white space detector 52. The detectors 50 and 52 determine the width of the black mark or white space by counting the length of time the output signal 44 is either high or low using an internal clock signal and comparing that count to a preselected range of acceptable width counts. In the preferred embodiment, the detectors 50 and 52 are clocked with a clock frequency of 1 MHz. The black mark detector 50 includes a white-to-black transition detector 54, a width detector 56 with associated memory devices or switches to store the maximum and minimum values of the preselected range of acceptable width counts and a valid width latch 58. Similarly, the white space detector 52 includes a black-to-white transition detector 60, a width detector 62 with associated memory devices or switches to store the maximum and minimum values of the preselected range of acceptable width counts and a valid width latch 64. In one embodiment, the transition detectors 54 and 60 are 74F122 retriggerable one-shot delays. The width detectors 56 and 62 are 74F191 counters and 74F521 identity comparator having switches set for the respective minimum and maximum values representing the preselected range of acceptable width counts for each of the black marks and white spaces. In the preferred embodiment, the range of acceptable width counts is set to count only the wide bar and wide spaces of a bar code 12. For the preferred embodiment, the range of acceptable width counts is set between 130 and 180 counts based on the widths of the wide black marks and wide white spaces and the clocking frequency of the detectors 56 and 62. It will be apparent, however, that the range of acceptable width counts may be set to any combination of wide or narrow bars or spaces as may be seen fit for the particular application.

The first comparator means 24 is also comprised of a pair of comparators, black mark comparator 70 and white space comparator 72. Black mark comparator 70 is comprised of a black mark counter 73 with associated memory devices or switches to store the maximum and minimum values of the preselected range of acceptable counts of wide black marks and a black mark count latch 74. White space comparator 72 is comprised of a white space counter 75 with associated memory devices or switches to store the maximum and minimum values of the preselected range of acceptable counts of wide white spaces and white space count latch 76. The outputs of the latches 74 and 76 are combined at AND element 78 to produce a Valid Sweep Signal 80. By detecting both the wide black marks and wide white spaces, the present invention verifies the accuracy of the number of marks by checking the number of spaces, and vice versa. The counters 73 and 75 are preferrably 74F191 counters and 74F521 identity comparators having switches set for the respective minimum and maximum values representing the preselected range of acceptable black mark and white space counts for the bar code being scanned. As will be described in greater detail hereinafter, the range of acceptable black mark and white space counts is dependent on the number of digits encoded in the bar code 12.

The second comparator means 26 is comprises of a memory means 82 and a NAND element 84 for determining if a Valid Sweep Signal 80 was received for two consecutive sweeps. In the preferred embodiment, the memory means 82 is comprised of a pair of JK flip-flops 74F112 and the NAND element 84 is a 74F20 NAND gate. If the second comparator means 26 determines that a Valid Sweep Signal 80 was present for two consecutive sweeps, the discriminator apparatus 10 assumes that a bar code 12 is present in the target area 18 and sets the Bar Code Present Signal 86. The Bar Code Present Signal 86 is also sent through Latch 88 to the bar code decoder 36 to signal the BCS 32 to begin the actual scanning and decoding of the bar code 12. If the scanning means 20 has completed a predetermined number of sweeps indicating that the entire target area 18 has been scanned, then the apparatus 10 assumes that a bar code 12 was not discriminated on the scannable form 14 and the Picking Signal is sent to the OMR 30 indicating that it should pick the scannable form 14 from the input hopper and begin scanning the response indicia 16 on the scannable form 14.

In the preferred embodiment, the interface between the discriminator apparatus 10 and the OMR 30 and BCS 32 is controlled by an enabling means 28. The enabling means 28 receives status signals from the OMR 30 and BCS 32 and transmits control signals to the discriminator apparatus 10, the BCS 32 and back to the OMR 30. In this embodiment, the enabling means 28 receives an Input Hopper Ready Signal 90 and Input Hopper Up Position Signal 91, indicating that the input hopper is in the proper position and that the scannable forms 14 are ready. Operation of the discriminator apparatus 10 is inhibited via Inhibit/Reset Signal 92 when either Input Hopper Signal 90 or Input Hopper Up Position 91 are not present. The enabling means 28 also receives two signals, Lead Edge at Read Head Signal 94 and Sheet Pick Command Signal 95, indicating the status of a scannable form 14 once it has been picked from the input hopper. From the time that Sheet Pick Command Signal 95 is received until Lead Edge at Read Head Signal 94 is received, the enabling means 28 inhibits operation of the discriminator apparatus 10 via Inhibit/Reset Signal 92.

When the second comparator means 26 indicates that a bar code 12 is present in the target area 18, the enabling means 28 passes the Bar Code Present Signal 86 on to the OMR 30. The bar code decoder 36 is also connected to the enabling means 28 and during the bar code decode time, the enabling means 28 indicates that decoding is occuring via Bar Code Read Signal 97. During this time, the OMR 30 will not pick the next scannable form 14 from the input hopper and the discriminator apparatus 10 is reset, prepare for discrimination of the next scannable form 14 when the input hopper is ready. Finally, the enabling means 28 monitors the number of times the scanning means 20 sweeps across the target area 18. When the scanning means 20 has completed a predetermined number of sweeps indicating that the entire target area 18 has been scanned, the enabling means 28 raises Target Time Out Signal 98 to the OMR 30, indicating that a bar code 12 was not discriminated (found) on the scannable form 14 and that the OMR 30 should pick the sheet from the input hopper and beging scanning the response indicia 16 on the scannable form 14.

In the preferred embodiment, the first comparator means 24 and second comparator means 26 are also connected to a reset circuit 100 that comprises part of the enabling means 28. The reset circuit 100 is comprised of a left-right sweep transition detector 102 and a right-left sweep transition detector 104, the output of both being combined at OR element 106 to produce the Reset Signal 108. The Reset Signal 108 is used to reset the comparators 70 and 72, and the latches 74 and 76. In addition, the Reset Signal 108 acts as a clocking signal for the memory 82 to clock the previous state of the Valid Sweep Signal 80 out of the memory and into the NAND element 84 for comparison with the current state of the Valid Sweep Signal 80. At the same time, the current state of the Valid Sweep Signal 80 is clocked into the memory 82. The Reset Signal 108 is also used by the enabling means 28 to count the number of sweeps that the scanning means 20 has made across the target area 18. When a predetermined number of sweeps has been made, approximately seven for the preferred embodiment, the entire target area has been scanned by the laser beam through the oscillating mirror 42 and the discriminator apparatus assumes that no bar code 12 is present if Bar Code Present Signal 86 has not been set during that time.

Figure 4:
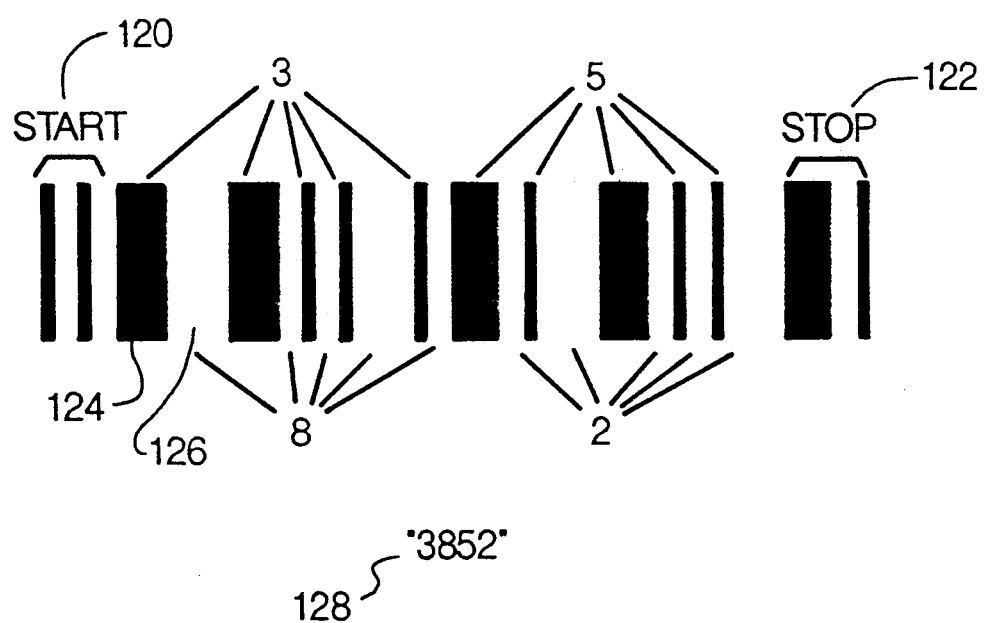
FIG. 4 is a representation of an interleaved 2 of 5 bar code that may be discriminated by the preferred embodiment of the present invention.

Referring now to FIG. 4, the preferred embodiment of a bar code 12 to be discriminated by the method and apparatus of the present invention will be described. A bar code 12 in the Interleaved 2 of 5 (interleaved 2 of 5) symbology consists of a Start character 120 to the left, an even number of digits and a Stop character 122 to the right. The encoding technique used in interleaved 2 of 5 symbology uses both the bars 124 and the spaces 126 to encode the digits of the identification code shown in standard digital format at 128. The odd numbered digits are represented in the bars 124, while the even numbered digits are represented in the spaces 126. The Start character 120 to the left of the bar code consists of the following sequence: narrow bar, narrow space, narrow bar, and narrow space. The Stop character 122 to the right of the bar code consists of the following sequence: wide bar, narrow space, narrow bar. It should be noted that neither the Start character 120, nor the Stop character 122 are interleaved with any other digits or data. The complete encoding convention for interleaved 2 of 5 symbology is set forth in Table 1, where the narrow elements (either bars 124 or spaces 126) are identified by a 0 bit and the wide elements are identified by a 1 bit. It will be seen that the reason this type of symbology is referred to as interleaved 2 of 5 is that for each character, two of the five bits are always on or "1" and three of the bits are off or "0". FIG. 4 shows the interleaved 2 of 5 encoding for a bar code 12 corresponding to an identification code of "3852".

TABLE 1

| Character | Code |
| --- | --- |
| 0 | 00110 |
| 1 | 10001 |
| 2 | 01001 |
| 3 | 11000 |
| 4 | 00101 |
| 5 | 10100 |
| 6 | 01100 |
| 7 | 00011 |
| 8 | 10010 |
| 9 | 01010 |

The identification code 128 developed by decoding the bar code 12 is used to correlate the scannable form 14 with background or identification data in a pre-existing data file. The data file may contain such information as, for example in the case of a student testing application, the student's name, sex, date of birth, ID, school name, grade, room number, teacher name, demographic data, etc. When a data file containing this information is generated, a unique identification code 128 is assigned to each data record in the file. In the preferred embodiment, the identification code 128 is either a seven or nine digit number with a single check digit encoded as either an eight or ten digit interleaved 2 of 5 bar code. In this embodiment, bar code labels may be printed from the data file and applied to the scannable forms 14 before they are sent to the field for administration. After the test is completed, the scannable forms 14 are collected and the identification code 128 is used to correlate the particular form to a data record in the data file so that both the data on the scannable form 14 and the data from the data record can be reported together.

As best seen in FIG. 2, in the preferred embodiment of the scannable form 14, the target area 18 is located along one of the edges of the scannable form 14. The target area 18 must be 0.5" higher than and 0.5" wider than the bar code 12. In one embodiment, the bar code 12 is placed on the scannable form 14 by using a bar code label. Types of labels suitable for this embodiment include self adhesive labels such as those available from Avery Self-Adhesive or heat activated labels applied using apparatus such as the Xerox Chesire 695 Labeling machine.

For the HPS 9101 scanner, the labels should be no closer than 0.25" from any code mark, scan track or response indicia. The labels should be positioned in an upright position parallel to the trailing edge of the scannable form 14. When labels are applied to OMR mark reflective read forms, the target area 18 should be located as follows: (1) in an area 4.1" wide located between points 3.5" and 7.6" from the registration edge opposite the timing track edge; or (2) in an area 3.5" high located between 2.0" and 5.5" from the trailing edge of the scannable form 14. In general, the target area 18 should not be placed closer than 2.0" to the trailing edge of the scannable form 14 due to the tendency of the forms to creep forward in the input hopper prior to the time that the scanning means 20 is activated. When the labels are applied to Transoptic type (transmitted light read) forms, the target area 18 should be located as follows: (1) in an area 4.1" wide located between points 3.5" and 7.6" from the timing track edge; or (2) in an area 3.5" high located between 2.0" and 5.5" from the trailing edge of the scannable form 14.

Referring now to FIGS. 5a-5c, it will be seen that for the method and apparatus of the present invention to function properly, the scanning frequency of the scanning means 20 must be such that an assumption can be made that two consecutive sweeps of the scanning means 20 will produce similar mark patterns for an area on the scannable form 14 where there is a bar code 12, but will produce different mark patterns for an area where there is text or response indicia 16. In the preferred embodiment, the detection means 22 is set to detect the presence of only the wide black marks and wide white spaces of an interleaved 2 of 5 bar code. By knowing the number of digits to be encoded, eight for example, the number of wide black marks and wide white spaces is also known, in this case eight wide black marks and eight wide white spaces. For this example, the range of valid detected black marks and white spaces would be 7 to 9.

Because there is no decoding of the pattern of widths of marks and spaces in an attempt to determine whether a proper bar code pattern was detected on a single pass, the time necessary to discriminate whether a bar code 12 is present in the target area 18 is simply the time for the scanning means 20 to complete a full series of sweeps of the target area 18, plus the minimal processing time of the detection means 22 and the first and second comparator means 24 and 26. The sweep pattern is controlled by the frequency of oscillation of the oscillating mirror 42. If the sweep rate is set too slow, as shown in FIG. 5b, then it is possible that two consecutive sweeps might not come up with the same range of numbers of wide black marks and wide white spaces. If the sweep rate is set too fast, as shown in FIG. 5c, then time is wasted by excessive scanning of the target area 18. FIG. 5a shows the preferred scanning sweep rate.

The present invention represents a significant improvement over the prior art for determining whether a bar code is present on a scannable form. The discriminating power of the present invention lies in the utilization of three different tests to discriminate the bar code 12 on the scannable form 14: an acceptable range of widths of the indications in the bar code 12; an acceptable range of counts of the number of indications in the bar code 12; and two consecutive acceptable sweeps to discriminate the presence of the bar code 12 on the scannable form 14.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. An apparatus for discriminating the presence of a bar code on a scannable form to be scanned by an optical mark reader and scanning the bar code if present on the scannable form, comprising:
   scanning means for scanning a target area on the scannable form and producing a signal in response to the intensity of indications in the target area;
   detection means responsive to the scanning means for detecting indications having a width within a specified range of widths;
   first comparator means responsive to the detection means for comparing the number of detected indications to a specified range of valid numbers of detected indications and producing an output signal indicating when the number of detected indications falls within the specified range;
   second comparator means responsive to the first comparator means for storing the output of the first comparator means and comparing the output of the first comparator means for two consecutive sweeps and producing an enabling signal when the output of the first comparator means is valid for two consecutive sweeps; and
   bar code scanning means responsive to the enabling signal for rescanning the bar code and decoding the bar code data obtained during the rescan of the bar code.

2. The apparatus of claim 1 wherein the indications are black marks and white spaces.

3. The apparatus of claim 1 wherein the bar code to be discriminated is an interleaved 2 of 5 symbology.

4. The apparatus of claim 3 wherein the specified range of widths for the indications is a range of widths for wide black marks and wide white spaces that comprise the bar code.

5. The apparatus of claim 4 wherein the specified range of valid numbers of detected indications is based on the number of wide black mark and wide white spaces in the bar code.

6. A method for discriminating whether a bar code is present on a scannable form to be scanned by an optical mark reader and scanning the bar code if present on the scannable form, the method comprising the steps of:
   scanning a target area on the scannable form by sweeping across the target area and producing a signal in response to the intensity of indications in the target area;
   detecting indications having a width within a specified range of widths;
   comparing the number of detected indications to a specified range of valid numbers of detected indications;
   storing a valid signal if the number of detected indications is within the specified range of valid numbers of detected indications;
   determining if a valid signal is present for two consecutive sweeps;
   producing an enabling signal when the valid signal is present for two consecutive sweeps; and
   in response to the enabling signal, rescanning the bar code and decoding the bar code data obtained during the rescan of the bar code.

7. An apparatus for discriminating the presence of a bar code on a scannable form to be scanned by an optical mark reader and producing an enabling signal indicating the presence of the bar code on the scannable form which is provided to a bar code scanning means responsive to the enabling signal for rescanning the bar code and decoding the bar code data obtained during the rescan of the bar code, the apparatus comprising:
   scanning means for scanning a target area on the scannable form and producing a signal in response to the intensity of indications in the target area;
   detection means responsive to the scanning means for detecting indications having a width within a specified range of widths and for comparing the number of detected indications to a specified range of valid numbers of detected indications and producing an output signal indicating when the number of detected indications falls within the specified range; and
   comparator means responsive to the detection means for storing the output of the detection means and comparing the output of the detection means for two consecutive sweeps and producing an enabling signal when the output of the detection means is valid for two consecutive sweeps, such that the enabling signal enables the bar code scanner to rescan and decode the bar code.

* * * * *